S. G. RUSSELL.
FISHING REEL.
APPLICATION FILED APR. 21, 1921.
1,417,632.
Patented May 30, 1922.
3 SHEETS—SHEET 1.
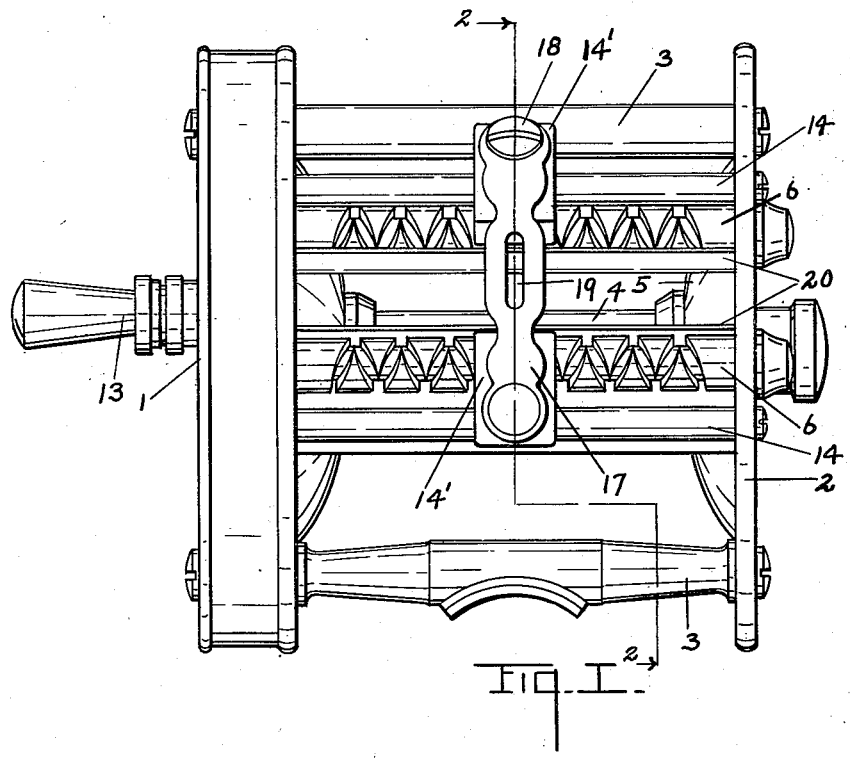
Fig. I.
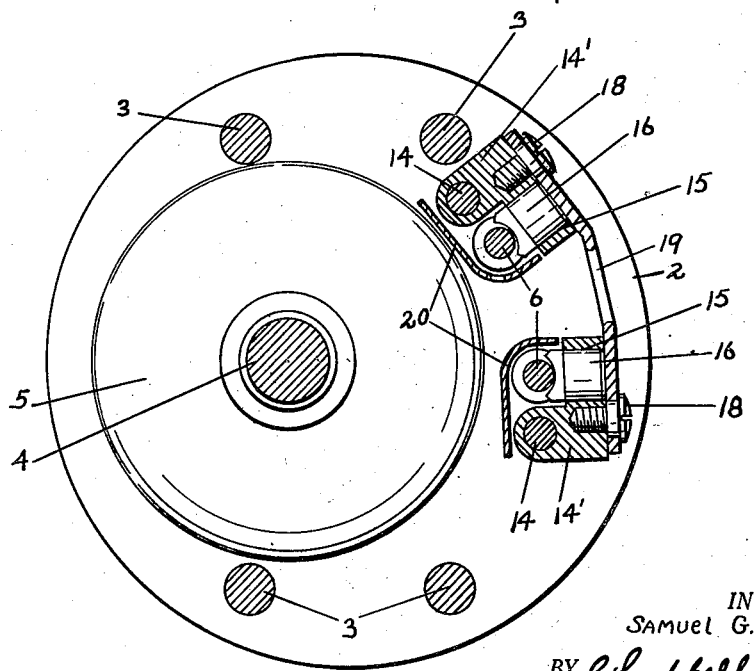
Fig. II.
INVENTOR.
Samuel G. Russell
BY Chappell Earl
ATTORNEYS.

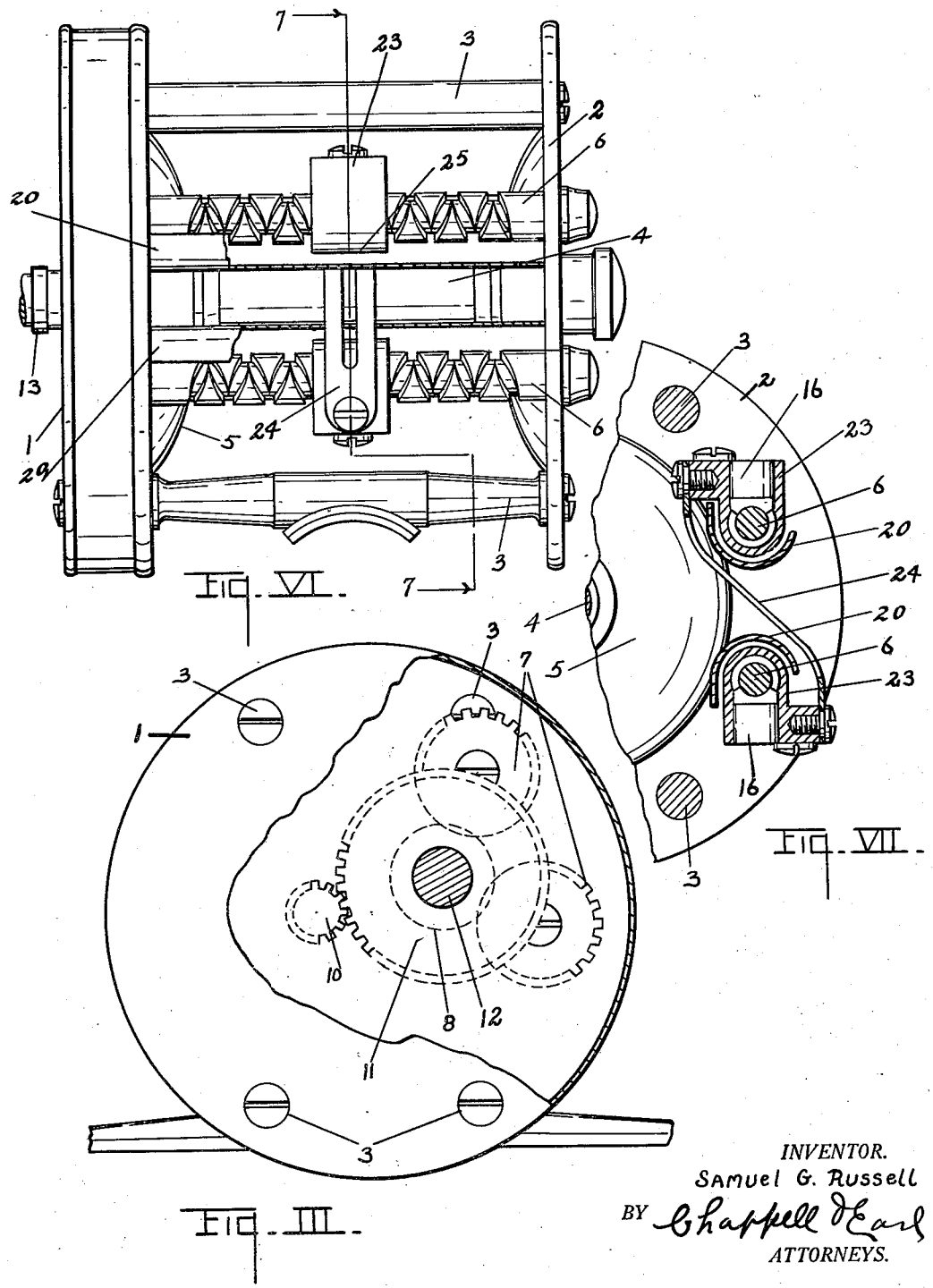

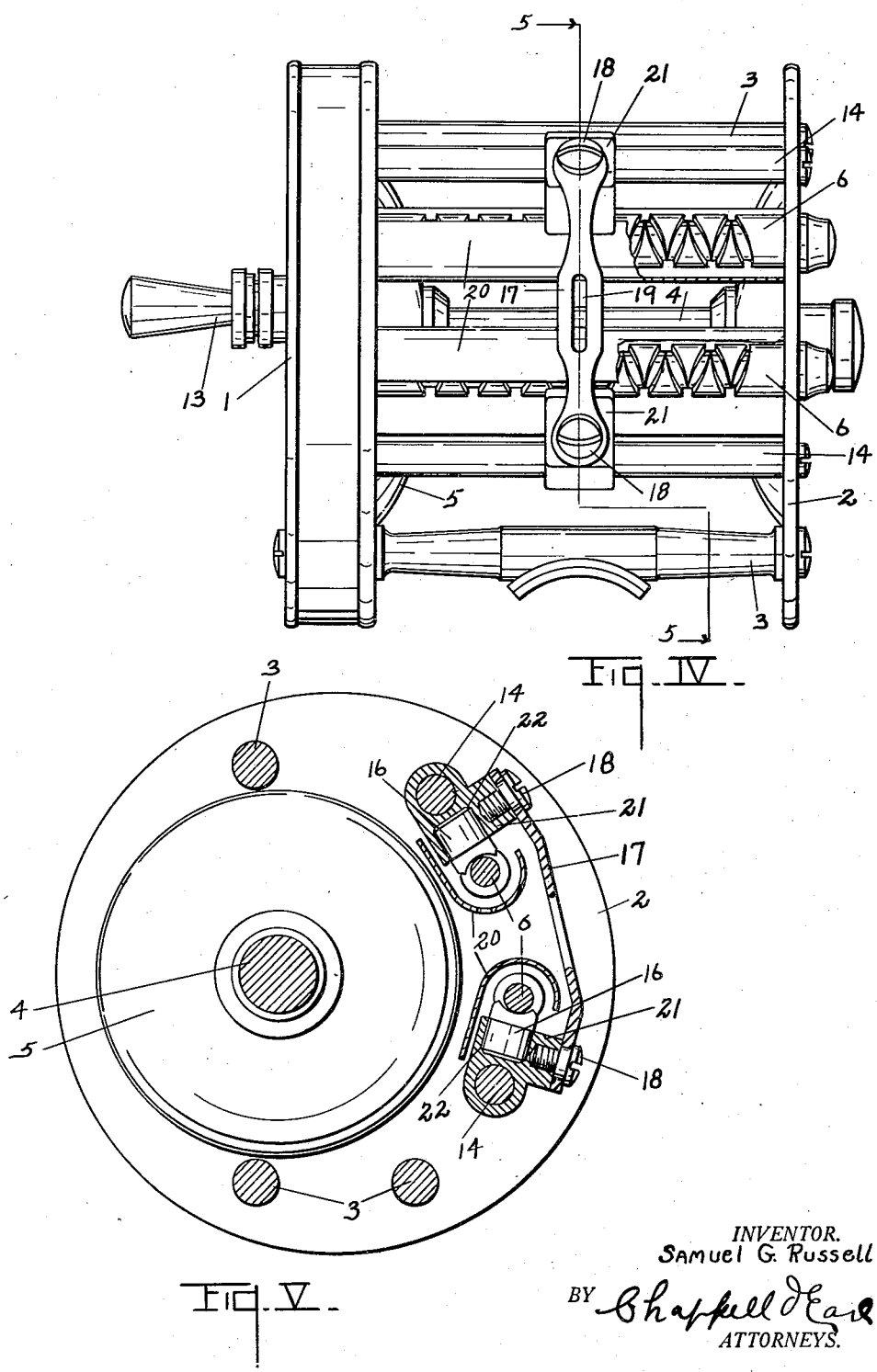

UNITED STATES PATENT OFFICE.

SAMUEL G. RUSSELL, OF KALAMAZOO, MICHIGAN, ASSIGNOR TO THE SHAKESPEARE COMPANY, OF KALAMAZOO, MICHIGAN.

FISHING REEL.

1,417,632.  Specification of Letters Patent.  Patented May 30, 1922.

Application filed April 21, 1921. Serial No. 463,321.

*To all whom it may concern:*

Be it known that I, SAMUEL G. RUSSELL, a citizen of the United States, residing at the city and county of Kalamazoo, State of Michigan, have invented certain new and useful Improvements in Fishing Reels, of which the following is a specification.

This invention relates to improvements in fishing reels.

The main objects of this invention are:

First, to provide an improved fishing reel of the level wind type in which friction of the parts is minimized and the parts are not likely to bind at any point in the movement thereof.

Second, to provide an improved fishing reel having these advantages in which the parts are simple and economical to produce and easily assembled.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a side elevation of a fishing reel embodying the features of my invention.

Fig. II is a transverse section thereof on a line corresponding to line 2—2 of Fig. I.

Fig. III is an end view from the left of Fig. I with parts broken away to show the arrangement of gears.

Fig. IV is a side elevation of a slightly modified form of my invention.

Fig. V is a transverse section on a line corresponding to the broken line 5—5 of Fig. IV.

Fig. VI is a side elevation of a further modification or adaptation of my improvements.

Fig. VII is a detail transverse section on a line corresponding to the broken line 7—7 of Fig. VI.

In the drawing similar reference characters refer to similar parts throughout the several views, and the sectional views are taken looking in the direction of the little arrows at the ends of the section lines.

Referring to the drawing, 1 represents the head and 2 the tail member of the reel frame. These are connected by the pillars 3. The shaft 4 of the spool 5 is journaled in suitable bearings on the end members of the frame. I also mount on the end members of the frame a pair of traversing shafts 6, the shafts being disposed in a spaced relation and parallel to each other.

The driving means for the spool and these shafts is illustrated in Fig. III, each traversing shaft being provided with pinions 7 meshing with a pinion 8 which in turn is integral with or rigidly mounted upon gear 11. The spool shaft is provided with a pinion 10 meshing with a gear 11 on the staff 12, the crank 13 being attached to the hub of gear 11. The details of this driving mechanism form no part of my present invention.

Parallel to each of the traversing shafts 6 I arrange carriage slide rods 14 on which the carriages 14' are mounted. These carriages are provided with sockets 15 for the pawls 16 which are supported therein to co-act with the traversing shafts. These pawl sockets are open at their outer ends so that the pawls may be inserted or removed from the outer ends of the sockets, which is of considerable convenience in the matter of assembling or disassembling.

The link-like line guide member 17 is pivotally secured to the carriages by the screws 18, the line guide member being extended across the pawl sockets and constituting a means for retaining the pawls. The line guide member is provided with an eye 19 for the line.

Housing or guard members 20 are arranged between the spool and the shafts and carriage slide rods to project outwardly from the traversing shafts.

With the parts thus arranged, the carriages are supported entirely by the slide rods and the traversing shafts merely serve to drive the carriages through their pawls. The carriages slide very freely and any slight irregularities in the feed thereof is equalized in the line guide member, being pivotally mounted thereon, and this line guide member is supported so that binding action on the carriages is minimized.

In the modifications shown in Figs. IV and V the carriages 21 are provided with pawl sockets 22 disposed between the traversing shafts and the slide rods.

In the embodiment shown in Figs. VI and VII the slide rods are omitted, the carriages 23 being slidably mounted upon the traversing shafts, the carriages being supported by the line guide member 24 which is pivotally connected thereto as in the embodiments described.

The carriages have opposed curved portions 25 over which the line may play as it works through the line guide eye.

My improved fishing reel is simple and economical in its parts and these parts are easily and rapidly assembled. Reels embodying these features are found to run very freely and without danger of catching or binding at some particular point in the travel of the line guide carriages.

Having thus described my invention, what I claim as new and desire to secure by Letters Patent, is:

1. In a fishing reel, the combination of a frame, a spool, a pair of traversing shafts, a pair of carriage slide rods disposed at the outer sides of said shafts and parallel thereto, line guide carriages slidable on said rods and provided with pawl sockets open at the front of the carriages, pawls disposed in said sockets to coact with said shafts, a line guide link pivotally mounted on said carriages, said link being disposed across the outer ends of said pawl sockets for retaining the pawls therein, and housing members disposed between the spool and the shafts and carriage slide rods and extending outwardly between the shafts.

2. In a fishing reel, the combination of a frame, a spool, a pair of traversing shafts, a pair of carriage slide rods disposed at the outer sides of said shafts and parallel thereto, line guide carriages slidable on said rods and provided with pawl sockets open at the front of the carriages, pawls disposed in said sockets to coact with said shafts, and a line guide link pivotally mounted on said carriages, said link being disposed across the outer ends of said pawl sockets for retaining the pawls therein.

3. In a fishing reel, the combination of a frame, a spool, a pair of traversing shafts, a pair of carriage slide rods disposed at the outer sides of said shafts and parallel thereto, line guide carriages slidable on said rod and provided with pawls coacting with said shafts, a line guide member pivotally mounted on said carriages, and housing members disposed between the spool and the shafts and extending outwardly between the shafts.

4. In a fishing reel, the combination of a frame, a spool, a pair of traversing shafts, a pair of carriage slide rods disposed at the outer sides of said shafts and parallel thereto, line guide carriages slidable on said rod and provided with pawls coacting with said shafts, a line guide member pivotally mounted on said carriages, and housing members extending outwardly between the shafts.

5. In a fishing reel, the combination of a frame, a spool, a pair of traversing shafts, a pair of carriage slide rods disposed parallel to said traversing shafts, line guide carriages slidable on said rods and provided with pawls coacting with said shafts, and a line guide member pivotally connected to said carriages.

6. In a fishing reel, the combination of a frame, a spool, a pair of traversing shafts, line guide carriages provided with pawls coacting with said shafts, and a line guide member pivotally mounted on said line guide carriages.

7. In a fishing reel, the combination of a frame, a spool provided with a pinion, a pair of traversing shafts disposed in parallel relation at the side of the spool and journaled in said heads, a line guide carriage operatively associated with said traversing shafts, a pinion on each of said traversing shafts, a driving gear meshing with said spool pinion, and a driving pinion disposed at the inner side of said driving gear and meshing with both of said traversing shaft pinions.

In witness whereof, I have hereunto set my hand and seal in the presence of two witnesses.

SAMUEL G. RUSSELL.

Witnesses:
LUELLA G. GREENFIELD,
MARGARET L. GLASGOW.